United States Patent [19]

Gibbard et al.

[11] 4,452,868
[45] Jun. 5, 1984

[54] METAL-CHLORINE CELL WITH STORAGE OF CHLORINE

[75] Inventors: Henry F. Gibbard, Schaumburg; William P. Krug, Hoffman Estates, both of Ill.; Stephen D. Darling, Akron, Ohio; Mark W. Beranek, Arlington Heights, Ill.

[73] Assignee: Gould Inc., Rolling Meadows, Ill.
[21] Appl. No.: 454,282
[22] Filed: Dec. 29, 1982
[51] Int. Cl.$^3$ .................... H01M 12/06; H01M 8/18
[52] U.S. Cl. ........................... 429/21; 429/29; 429/101; 429/198
[58] Field of Search .................. 429/15, 101, 29, 21, 429/46, 105, 198

[56] References Cited

U.S. PATENT DOCUMENTS

| | | | |
|---|---|---|---|
| 1,377,722 | 5/1921 | Marconi | 429/14 |
| 1,958,370 | 5/1934 | Schmelkes | 167/17 |
| 1,958,371 | 5/1934 | Schmelkes | 260/86 |
| 2,184,886 | 12/1939 | Muskat | 260/248 |
| 2,184,888 | 12/1939 | Muskat | 23/190 |
| 2,306,927 | 12/1942 | Arsem | 136/137 |
| 2,678,930 | 5/1954 | Weldon | 260/309.6 |
| 2,874,204 | 2/1959 | Morehouse | 136/100 |
| 3,003,971 | 10/1961 | Prichard | 252/187 |
| 3,007,876 | 11/1961 | Schaeffer | 252/99 |
| 3,713,888 | 1/1973 | Symons | 136/6 |
| 4,038,459 | 7/1977 | Ajami et al. | 429/15 |
| 4,038,460 | 7/1977 | Walsh et al. | 429/50 |
| 4,064,324 | 12/1977 | Eustace | 429/101 |
| 4,104,447 | 8/1978 | Walsh et al. | 429/15 |
| 4,162,351 | 7/1979 | Putt et al. | 429/15 |

FOREIGN PATENT DOCUMENTS 824199 11/1959 United Kingdom .

OTHER PUBLICATIONS

Kirk-Othmer-Encyclopedia of Chemical Technology-"Chloramies and Chloroamines," Robson (2nd Edition).
"Dibromamin:Acylderivate", Von Gottardi, Monatshefte fur Chemie 104, 421-432 (1973).
"N-Halogen Organic Compounds as Cathode Materials for Primary Batteries", Morehouse and Glicksman, J. Electrochemical Society, vol. 104, #8, pp. 467-473 (1957).
"Pseudo-Halogens, VII Scope and Mechanism of Addition of N,N-Dichlorourethan to Monoolefinic Compounds", Foglia and Swern, J. Org. Chem., 31, pp. 3625-3630 (1966).
"Recent Developments in Pseudohalogen Chemistry", Swern, American Chemical Society, Symposium on New Olefin Chemistry, pp. E-39-51 (1970).
"Preparation of Methyl and Ethyl N Monochlorocarbamates by Disproportionation", Czapf, Gottlieb, Whitfield and Swern, J. Org. Chem., vol. 38, No. 14, pp. 2555-2556 (1975).
"Pseudohalogens XXI, N-Chloro Amides with Electron-Withdrawing Groups on Nitrogen", Cottrell, Abrams and Swern, Org. Prep. Proced. Int. 8 (1), pp. 25-32 (1976).
"N,N-Dihalophosphoramides-I Synthesis of Diethyl N,N-Dichlorophosphoroamidate (DCPA) and Some of its Structural Analogues", Zwierzak and Koziara, Tetrahedron, vol. 26, pp. 3521-3525 (1970).
"Chemistry of N-Bromamines and N-Chloramines", Kovacic, Lowery and Field, Chemical Reviews, 70, pp. 639-665 (1970).
"New Aspects of the Hofmann-Loeffler N-Chloramine Rearrangement in Acetic Acid", Neale and Walsh, J. Am. Chem. Soc., vol. 87, pp. 1255-1261 (1965).
"N-N-Dihalophosphoramides—VI Synthesis and Some Preparative Applications of Dialkyl N,N-Dibromo-Phosphoroamidates", Zazadzki and Zwierzak, Tetrahedron, vol. 29, pp. 315-320 (1973).
"Chloramines and Bromamines", Kirk-Othmer, Encyclopedia of Chemical Technology (3rd Ed.), vol. 5, pp. 565-578.

*Primary Examiner*—Donald L. Walton
*Attorney, Agent, or Firm*—Edward E. Sachs; John C. Tiernan

[57] ABSTRACT

An electrochemical system including a chlorine positive electrode, such as zinc-chlorine cell, is disclosed which complexes chlorine by utilizing (1) a selected organic compound, such as, for example, n-butyl carbamate, which includes a $-NH_nR_{2-n}$ functionality wherein R is an appropriate organic moiety, and n is an integer, either 1 or 2, and an electron-withdrawing substituent alpha to the nitrogen and (2) a buffer to provide a liquid oil, which yields chlorine when required in discharge of the cell.

19 Claims, 1 Drawing Figure

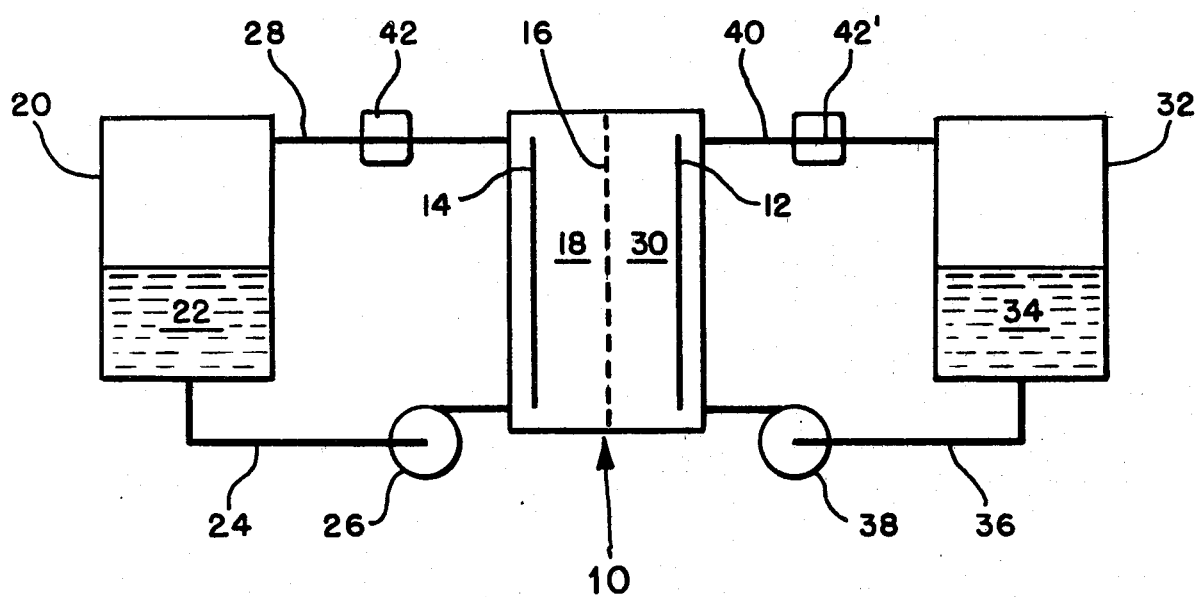

METAL-CHLORINE CELL WITH STORAGE OF CHLORINE

BACKGROUND OF THE INVENTION

1. Field of the Invention

This invention relates to electrochemical systems such as zinc-chlorine, including a chlorine positive electrode, and to an improved technique for reversibly storing chlorine in such systems.

2. Description of the Prior Art

Conceptually, the zinc-chlorine cell can be considered to be among the simplest of electrochemical systems in that only zinc, chlorine and zinc chloride actively participate in the basic electrochemical reaction. In its most elementary form, a rechargeable zinc-chlorine cell could be constructed with two inert, electronically conductive electrode substrates in an aqueous solution of zinc chloride. A charge/discharge cycle would thus involve the deposition and the subsequent anodic dissolution of zinc at the negative electrode and the liberation of chlorine with its subsequent cathodic reduction at the positive electrode. Moreover, and importantly, this system potentially can provide relatively high energy densities.

While such a battery is inherently simple from the electrochemical standpoint, chlorine gas, which is highly toxic and corrosive, is liberated during the charge cycle and is difficult to handle. Further, and importantly, the chlorine being formed in the charge cycle must be stored in some fashion to avoid severe performance penalties due to coulombic inefficiencies. However, the chlorine stored during charging must be made available during the discharge cycle to provide satisfactory voltaic efficiencies.

A major problem in the design of cells of this type has been to provide an efficient means of chlorine storage while providing, during discharge, adequate chlorine availability. One early attempt at storing chlorine in a zinc-chlorine system is described in U.S. Pat. No. 1,377,722. Chlorine generated during charging is stored as a liquid by introducing a gas such as air or hydrogen to pressurize the container to the desired level (e.g.—on the order of 20 atmospheres) to maintain chlorine in the liquid phase. In addition to requiring relatively expensive container materials, the complexity of the system is considered undesirable.

More recently, U.S. Pat. No. 3,713,888 describes a method for storing halogens in a battery system by employing halogen hydrates. The system described therein utilizes a circulating system wherein electrolyte is circulated through an electrode area and a hydrate of the halogen given off during charge is formed. The halogen hydrate, which is a solid, is subsequently stored in a separate storage area. This system involves relatively significant energy requirements due to the temperatures needed to maintain the solid halogen hydrate, thus inherently providing a relatively low energy efficiency for the system. It is further believed that this system may not provide the reliability desired for large cells or batteries, such as may be employed in load leveling applications.

Even more recently, U.S. Pat. Nos. 4,038,459 and 4,038,460 disclose a large number of compounds which may be added to the electrolyte of halogen cells to complex the halogen. U.S. Pat. No. 4,038,459 thus discloses various alcohols and nitriles which form insoluble oil-like complexes with halogens. U.S. Pat. No. 4,038,460 shows various halogen complexing ethers which likewise form insoluble, oil-like complexes with the halogens. A serious disadvantage of these alcohols, ethers, and nitriles is their instability. Such complexes tend to degrade rather rapidly in the cell environment. This approach is accordingly considered undesirable.

Thus, despite the potential of this system, as far as is known, little if any use has been made commercially. This is believed due, at least in major part, to the chlorine storage problem. Accordingly, despite the considerable efforts made over the years to provide an adequate solution, there still exists the need to provide a means of chlorine storage capable of achieving acceptable electrochemical performance characteristics in an efficient, reliable and adequately simple system.

Further, it is known that certain compounds will combine with chlorine to form chlorinated derivatives, often generally referred to as pseudo-halogens, typically having an N—Cl bond. While most of these compounds are believed to be solids, some are liquids, such as, for example, dichlorourethane. A substantial amount of literature has been generated, directed generally to the chemistry of such compounds.

Various pseudo-halogens have been utilized for many commercial applications. Pseudo-halogens have thus been suggested as a source of active chlorine, such as, for example, for disinfectant and/or sterilization purposes as well as in bleaching compositions. Generally, such use requires a relatively slow release of active chlorine; and, it is believed, that most, if not all, of the materials used heretofore were solids.

It has also been suggested to use pseudo-halogens in primary cells. For example, U.S. Pat. No. 2,874,205 describes a cell composed essentially of a high-magnesium alloy anode and a cathode material of which the key component is an organic oxidizing substance containing a chemically combined positive halogen. Suitable organic substances includes amines, amides, amides of dibasic acids or quinones, cyclic ureides, carbonic acid amidines and pyrrolidinones. Likewise, C. K. Morehouse and R. Glicksman, *N-halogen Organic Compounds as Cathode Materials for Primary Batteries*, J. Electrochem. Soc., 467–473 (1957) discuss the electrochemical characteristics of N-halogen organic compounds, including, for example, N-chlorosuccinimide, N,N'-dichlorobiuret, N,N'-dichlorodimethylhydantoin and trichloromelamine. It is believed that these pseudo-halogens were considered to be solid in form.

Accordingly, despite the body of literature generated over the years and the need to provide a satisfactory solution to the chlorine storage problem, liquid pseudo-halogens, as far as is known, have not ever been proposed as a solution to such problem.

It is accordingly a principal object of the present invention to provide an electrochemical system in which chlorine storage may be achieved in an efficient, reliable, and relatively simple fashion. A related object is to provide such a system capable of achieving acceptable electrochemical performance characteristics.

A further object provides such a system in which chlorine storage is achieved without any substantial efficiency penalty.

Yet another object of this invention lies in the provision of a system not involving high pressure conditions. A related and more specific object provides a system which minimizes toxicity and corrosion considerations.

A still further object is to provide such a system in which chlorine may be stored for extended periods of time without the occurrence of any significant degradation.

Another object of the present invention provides such a system characterized by substantial flexibility, allowing the chlorine storage in such a system to be tailored to the requirements of the intended application.

Other objects and advantages of the present invention will become apparent from the following description and from the sole FIGURE which illustrates an exemplary cell construction.

While the invention is susceptible of various modifications and alternative forms, specific embodiments thereof are described in detail herein. It should be understood, however, that it is not intended to limit the invention to the particular forms disclosed, but, on the contrary, the intention is to cover all modifications, equivalents, and alternatives falling within the spirit and scope of the invention as expressed in the appended claims. Thus, for example, while the present invention will be principally described in connection with the illustrated zinc-chlorine rechargeable cell, it should be appreciated that the present invention may likewise be employed in other aqueous primary and secondary cells. Indeed, the present invention may be suitably utilized, as an illustration, in various redox systems, for example, the $Cr^{2+}$, $Cr^{3+}$ || $Cl^-/Cl_2$ system.

SUMMARY OF THE INVENTION

The present invention is, in general, predicated on the discovery that the chlorine storage problem in a system such as zinc-chlorine can be solved by incorporating into the aqueous electrolyte suitable amounts of selected organic compounds containing a $-NH_nR_{2-n}$ functionality wherein R is an appropriate organic moiety and n is an integer, either 1 or 2. Such compounds, upon reaction with chlorine, form oils having a viscosity on the order of that of the electrolyte and may be readily accommodated in the system. By incorporation of an electron-withdrawing substituent alpha to the nitrogen in the $-NH_nR_{2-n}$ functionality, and by suitable buffering of the electrolyte, the resulting oil phase formed will possess the required stability for use as a chlorine storage means in the electrochemical environment, yet can liberate chlorine for utilization during discharge of the system. Appropriate tailoring of the substituents of such organic compounds allows the chlorine to be partitioned between the oil and aqueous electrolyte phases in a fashion to achieve highly desirable coulombic efficiencies.

DETAILED DESCRIPTION OF THE PREFERRED EMBODIMENT

The general operation and components of zinc-chlorine cells are well known. Thus, basically, the cell comprises a positive electrode (the chlorine electrode), a negative electrode (the zinc electrode), a separator therebetween, and a suitable electrolyte, such as, for example, an aqueous zinc chloride solution. On charge, zinc metal is plated on the face of the negative electrode substrate, and remains there until the cell is discharged. The positive electrode surface, on the other hand, should exhibit a low overvoltage for the chlorine/chloride redox couple. As an illustrative example, a titanium electrode substrate coated with a ruthenium dioxide catalyst, such as used in the chloralkali industry (i.e.—a dimensionally stable anode) has been found suitable.

The separator used must be capable of satisfying, in general, two functions. The separator must be capable of minimizing the chlorine transport rate from the positive electrode to the negative electrode. Additionally, the material selected for the separator should be chemically inert in the cell environment and should have a low resistance to the passage of ions. Various microporous and cation-exchange materials may be utilized and are known in the art. As one illustrative example, a conventional "DARAMIC" microporous polyethylene separator (W. R. Grace) has been found suitable.

It is preferred to employ a system which utilizes a circulating electrolyte system of some sort to enhance the rate of mass transport in the charge/discharge reactions, and to minimize the formation of zinc dendrites. Since the electrolyte on the negative electrode side of the separator should have a much lower chlorine concentration than the electrolyte on the positive electrode side, two separate flow loops are desirably provided. Generally, in a system of this type, the electrolyte will be under constant circulation, making many passes through the cell during a single charge-discharge cycle.

The sole FIGURE illustrates an exemplary system. As shown, the system includes a cell, shown generally at 10, which includes a positive electrode 12, a negative electrode 14, and a separator 16 positioned between the electrodes.

Electrolyte flow through the negative side of cell 10, shown at 18, is provided by an electrolyte reservoir 20 containing electrolyte 22 which is transported through line 24 by pump 26 into the bottom of cell 10. Electrolyte is returned to reservoir 20 via line 28.

Electrolyte flow through the positive side of cell 10, indicated at 30, is provided by reservoir 32, containing electrolyte 34 that is transported via line 36 and by pump 38 into and through the positive side 30 of the cell. The electrolyte returns to reservoir 34 via line 40.

Conventional flow meters 42, 42' may be employed to determine the rate of electrolyte flow, if desired. As shown, flow meters 42, 42' are interposed in lines 28 and 40, respectively.

Further details of the configuration of the system are shown in U.S. Pat. No. 4,162,351 to Putt et al.

In accordance with the present invention, the electrolyte 34 contains a preselected amount of an organic compound and an appropriate buffer. During charging of the system, the chlorine formed at the positive electrode complexes with the organic compound to form an oil phase that is transported to the reservoir 32 with the circulating electrolyte. Suitably, the oil phase so formed may be collected in reservoir 32. After completion of charging, if the cell is not to be discharged for an extended period of time, the oil phase is preferably separated from the aqueous electrolyte. This may be accomplished by simply pumping the oil to a separate reservoir (not shown). When the cell is to be placed in service, the oil phase can be returned to reservoir 32.

Separation of the oil phase has been found desirable to avoid undue degradation which can occur upon extended contact with the aqueous, acidic electrolyte. Upon separation, the oil phase may be stored for extended periods of time with virtually no degradation occurring.

The organic compounds which are utilized in this invention must be sufficiently soluble in the aqueous electrolyte to allow the chlorine formed during charging to be taken up as an oil phase. Based upon the amount of chlorine that will be formed, the requisite solubility can be readily calculated.

A further requirement of such organic compounds can be seen by reference to the following generalized equation:

$$G-AH_n + nCl-Cl \rightleftharpoons G-A-Cl_n + nHCl$$

in which G represents an organic moiety. It is important that the equilibrium constant for the above-described equation be not too large or too small. For example, if the equilibrium constant is much larger than unity, then chlorine will not be released by the chlorinated oil during the discharge cycle. Voltaic inefficiencies may result if insufficient chlorine is generated to carry out the reaction because the current will not be sustained due to a deficiency of chlorine. The voltage may thus drop to an unacceptably low value at the rate at which discharge is being carried out. On the other hand, if the equilibrium constant is too small, then the chlorine generated during charge may escape from the cell. Coulombic inefficiencies may also result.

It has been found that the position of equilibrium may be maintained in the desired range for the organic compounds utilized in this invention by maintaining the pH of the aqueous electrolyte within a range of from about 1.9 to about 4, preferably from about 1.9 to about 2.5. As the pH is increased above about 4 or so, voltaic inefficiencies will ultimately result. Indeed, if the pH is too high, precipitation of zinc from the electrolyte could occur.

On the other hand, when the pH is allowed to fall below about 1.9 or so, a sufficient amount of the oil phase may not be formed. Moreover, and importantly, it is believed that some degradation of the chlorinated compound comprising the oil phase may occur more readily, particularly after extended contact with the aqueous, acidic electrolyte.

In addition to maintaining the desired pH, the buffer employed should be stable in the cell environment. It has been found suitable to employ a $NaH_2PO_4/H_3PO_4$ buffer, which will maintain a pH in the preferred range. Any other buffer system meeting the criteria herein may be likewise used.

A further requirement of the organic compounds utilized in the present invention is that adequate stability of the chlorinated compound that results be provided. As alluded to previously, adequate stability may be imparted by incorporation of an electron-withdrawing substituent alpha to the nitrogen in the $-NH_nR_{2-n}$ functionality in such compounds. The preferred substituent is $C=O$. Other suitable substituents include $-SO_3H$ and

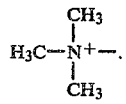

Yet another requirement of the organic compounds employed in this invention is that the resulting oil phase formed during charge partitions the chlorine between the aqueous and oil phases in a manner to provide the desired coulombic efficiencies. In general, this requirement will be satisfied when the solubility of the oil phase in the aqueous electrolyte is about two orders of magnitude less than that of the organic compound. A differential of this magnitude should allow coulombic efficiencies in excess of 85%. Of course, lesser differentials, e.g.—in the range of about one order of magnitude or even less, may be utilized, depending upon the coulombic efficiencies acceptable for the particular application.

It has been found that the differential solubility requirement may be satisfied by an appropriate selection of the compound architecture. Principally, as will be discussed hereinafter, this involves maintaining the total number of carbon atoms within a restricted range.

Accordingly, and pursuant to the present invention, it has been discovered that suitable oil phases upon chlorination will be formed by utilizing the following compounds:

(1)

wherein R is a lower alkyl, n is an integer of 1 or 2, and R' is a member selected from the group consisting of:
(a) acyl, alkyl or alkoxyl;
(b)

wherein R'' is a lower alkyl and m is an integer of from 0 to 2, and
(c)

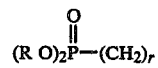

wherein R is a lower alkyl or acyl and r is an integer of from 0 to 2;
(2) $H_2N-SO_3H$;
(3)

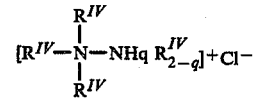

wherein the $R^{IV}$ groups are lower alkyls which may be the same or different and q is an integer of 1 or 2, and
(4) succinimide.

The length of the carbon chain will generally dramatically affect the solubility of the organic compound in the aqueous electrolyte. Excluding the $C=O$ carbon atom, it is preferred to employ in cases (1) and (3) an organic compound having from about 4 to 6 total carbon atoms, more preferably 4 or 5. Increasing the total number of carbon atoms above about 6 tends to reduce the solubility in the electrolyte below the level generally desired. On the other hand, a total number of carbon atoms of 3 or less will generally result in an oil phase which has a solubility too close to that of the organic compound to generally find utility.

It is preferred to utilize, as the organic compound, n-butyl carbamate. As illustrative examples, other compounds that should find utility include, in addition to sulfamic acid and succinimide, trimethylhydrazonium chloride, diethyl carbomyl phosphonate and diethyl acetamidophosphonate.

The preparation of the organic compounds described herein is known in the art, and some are commercially available. The particular synthesis utilized does not form a part of the present invention.

As has been described herein, the organic compounds which find utility are those which form liquid oils upon reaction with chlorine. Mixtures may be utilized, if desired; and one application of this sort could be to adjust the chlorine partition or solubilities to the level desired.

Indeed, one or more organic compounds that would form a solid chlorinated product may be incorporated if the result of the use of such a mixture results in an oil phase. This is a further potential means that may be suitable to adjust the chlorine partition and solubility levels.

Moreover, to fine tune such parameters, it may be desirable to utilize a mixture including an organic compound having a solubility level not markedly different from that of the oil formed from that compound. Examples of compounds in this regard include N-methylacetamide, t-butyl carbamate and 2-imidizolidinethione.

The nature of the chemistry involved allows considerable flexibility. The organic compound or compounds employed thus allow the system to be tailored to the requirements of the intended application.

The screening to determine whether a particular organic compound may be suitably used in this invention can be carried out in a straightforward fashion. After determining that the solubility is adequate, the compound can be reacted with gaseous chlorine in a suitable buffer (e.g.—sodium acetate/acetic acid ) by conventional synthetic chlorination techniques. A quantitative assay for chlorine will then determine whether a satisfactory chlorinated product is formed. A determination of adequate chlorine partition can then be carried out by adding the compound to the electrolyte, repeating the chlorination, and then quantitatively assaying for chlorine in the electrolyte and the resulting oil phase.

Suitable assaying techniques are known. As an example, the sample being tested can be placed in a glacial acetic acid/iodide solution to liberate $I_3^-$ ions, followed by titrating the free iodine liberated with 0.1N sodium thiosulfate. Every mole of active chlorine will yield a mole of $I_3^-$. The iodometric titration may thus be employed to determine, for example, the number of equivalents of chlorine incorporated per molecule of the organic compound. This is a measure of the molecular capacity to store chlorine.

It should be appreciated that in a system such as is illustrated herein viscosity could conceptually play an important part in selection of the organic compound. For example, if the oil phase formed was unduly viscous, the pumping requirements might become burdensome. In this event, the chlorine formed during charging could be transported to an external storage where reaction with the organic compound could be effected. However, this is an extra step that typically should be unnecessary. Thus, the use of butyl carbamate, as an example, forms an oil phase which has a viscosity on the order of that of the electrolyte.

Similarly, it is, of course, highly desirable that the oil phase be capable of being formed at a rate equal to the rate at which chlorine is formed during charging. Based upon present information, it appears that the reaction of chlorine proceeds with suitable organic compounds at a rate of 1 to 2 orders of magnitude greater than the rate of formation of chlorine under typical charging conditions. This should minimize toxicity and corrosion considerations.

The following Example is illustrative, and not in limitation, of the present invention.

EXAMPLE

This illustrates the feasibility of reversible chlorine storage according to the present invention in a secondary zinc-chlorine cell.

A 3.2 watt-hour, flow-by zinc-chlorine cell was assembled as illustrated in the sole FIGURE. The positive electrode, having an active area of 15.2 $cm^2$, was porous ruthenized titanium; and the negative electrode, having an active area of 15.2 $cm^2$, was titanium (planar in configuration). The electrodes were separated by a conventional "Daramic" microporous polyethylene separator having a thickness of 0.035 inch and a polypropylene spacer, 0.090 inch thick. The electrolyte comprised 1.1M $ZnCl_2$, about 0.23 M KCl and about 0.10 M n-butyl carbamate, the organic compound to be chlorinated. The electrolyte was buffered with $NaH_2PO_4$/$H_3PO_4$ to a pH of about 1.9. Further, the system was made gas-tight by sealing the various components with a commercially available epoxy material. The configuration used is basically that employed for a zinc-bromine cell.

The cell was charged for 3.9 hours at the rate of 32.9 mA/$cm.^2$. During that time, the cell voltage rose from 2.54v to 2.71v. As the cell charged, the appearance of the electrolyte in the positive side of the cell changed from clear to opaque, considered to be indicative of the presence of a chlorinated product of n-butyl carbamate. Qualitative analysis of such chlorinated product showed that active chlorine was present. The cell rested on open circuit with electrolyte circulating for 20.3 hours, during which time the open circuit voltage decreased from 2.20 volts to 1.98 volts. The cell was then discharged for 8.3 hours at the rate of 6.6 mA/$cm^2$. During discharge, the cell voltage decreased from 0.56 V to 0.28 V. The discharge was stopped to avoid cell reversal. The coulumbic efficiency calculated was greater than 85%.

The cell was then recharged for 0.9 hours at 32.9 mA/$cm^2$. The open circuit voltage before and after charge remained at about 2.00 V. A polarization study of the charge and discharge characteristics of the cell was then carried out over a range of current densities.

The charge data showed the cell performed satisfactorily. However, the discharge data show that the cell was much more severely polarized during discharge than charge. The voltaic efficiencies that are reflected by such data are less than would likely be desirable. It was considered, however, that principle was adequately demonstrated and that satisfactory voltaic efficiencies could be achieved by optimizing the configuration used for a zinc-chlorine cell, and perhaps by utilizing a flow-through positive electrode, as is known.

Thus, as has been seen, the present invention provides a facile solution to the chloride storage problem which has to date inhibited the commercial utilization of zinc-chlorine cells. The use of the expensive and complicated prior solutions has been obviated. The present invention provides a straightforward and reliable technique capable of achieving eminently satisfactory coulombic efficiencies.

We claim:

1. An electrochemical cell system comprising at least one positive electrode wherein chlorine is formed during charging of said cell, at least one negative electrode, a separator therebetween dividing said cell into a positive side and a negative side, an aqueous electrolyte contained in said cell, said electrolyte containing a buffer maintaining the pH in a range of from about 1.9 to about 4 and at least one compound selected from the group consisting of:

(1)

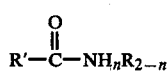

wherein R is a lower alkyl, n is an integer of 1 or 2, and R' is a member selected from the group consisting of:
(a) acyl, alkyl or alkoxyl;
(b)

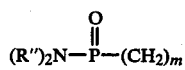

wherein R'' is a lower alkyl and m is an integer of from 0 to 2, and
(c)

$$(RO)_2\overset{\underset{\displaystyle O}{\|}}{P}-(CH_2)_r$$

wherein R'' is a lower alkyl or acyl and r is an integer of from 0 to 2;
(2) $H_2N-SO_3H$;
(3)

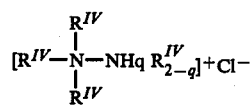

wherein the $R^{IV}$ groups are lower alkyls which may be the same or different and q is an integer of 1 or 2, and
(4) succinimide;
said compound being dissolved in said electrolyte and present in an amount sufficient to react with the chlorine formed and provide a liquid oil.

2. The cell system of claim 1 wherein said cell is a zinc-chlorine cell.

3. The cell of claim 2 wherein said pH is maintained in the range of from about 1.9 to about 2.5.

4. The cell system of claim 3 wherein said buffer is $NaH_2PO_4/H_3PO_4$.

5. The cell system of claim 1 wherein said system includes a first electrolyte reservoir located externally of said cell, a first means for circulating electrolyte between said first reservoir and said positive side of the cell, a second electrolyte reservoir located externally of said cell and a second means for circulating electrolyte between said second electrolyte reservoir and said negative side of the cell, said compound and said buffer being initially added to the electrolyte in the positive side of the cell.

6. The cell system of claim 5 wherein the electrolyte is continuously circulated between said positive and negative sides of the cell and said first and second electrolyte reservoirs during operation.

7. The cell system of claim 6 wherein said cell is a zinc-chlorine cell.

8. The cell system of claim 7 wherein said pH is maintained in the range of from about 1.9 to about 2.5.

9. The cell system of claim 8 wherein said buffer is $NaH_2PO_4/H_3PO_4$.

10. The cell system of claim 7 wherein the total number of carbon atoms in said compound, excluding the carbon in the C=O group, is in the range of 4 to 6.

11. The cell system of claim 10 wherein the total number of carbon atoms in said compound is 4 or 5.

12. The cell system of claim 7 wherein said compound is a member of the group having the formula,

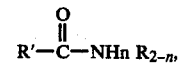

wherein R is a lower alkyl, n is an integer of 1 or 2, and R' is a member selected from the group consisting of (1) acyl, alkyl or alkoxyl, (2)

wherein R'' is a lower alkyl and m is an integer of from 0 to 2, and

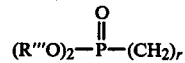

wherein R is a lower alkyl or acyl and r is an integer of from 0 to 2.

13. The cell system of claim 12 wherein R' is a lower alkyl.

14. The cell system of claim 7 wherein said compound is n-butyl carbamate.

15. The cell system of claim 7 wherein said compound is $H_2N-SO_3H$.

16. The cell system of claim 7 wherein said compound is a member of the group having the formula,

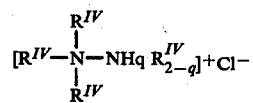

wherein the $R^{IV}$ groups are lower alkyls which may be the same or different and q is an integer of 1 or 2.

17. The cell system of claim 7 wherein said compound is succinimide.

18. The cell system of claim 7 wherein said compound is diethyl carbomyl phosphonate.

19. The cell system of claim 7 wherein said compound is diethyl acetamidophosphonate.

* * * * *

UNITED STATES PATENT AND TRADEMARK OFFICE
CERTIFICATE OF CORRECTION

PATENT NO. : 4,452,868
DATED : June 5, 1984
INVENTOR(S) : Henry F. Gibbard, et al.

It is certified that error appears in the above-identified patent and that said Letters Patent are hereby corrected as shown below:

In column 8 of the specification, line 61, delete "chloride" and insert therefor --chlorine--;

In column 9, Claim 1, line 30, after "(R" insert --"--.

Signed and Sealed this

Twenty-seventh Day of November 1984

[SEAL]

Attest:

GERALD J. MOSSINGHOFF

Attesting Officer

Commissioner of Patents and Trademarks